United States Patent
Kim et al.

(10) Patent No.: US 7,801,080 B2
(45) Date of Patent: Sep. 21, 2010

(54) ROOT MOBILE ROUTER AND THE OPERATING METHOD THEREOF IN DYNAMICALLY COMPOSED MOVING NETWORK

(75) Inventors: Won Tae Kim, Daejeon (KR); Heung Nam Kim, Daejeon (KR); Sun Ja Kim, Daejeon (KR); Do Hyung Kim, Daejeon (KR); Jae Pyeong Kim, Daejeon (KR); Hwan Gu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 705 days.

(21) Appl. No.: 11/834,838

(22) Filed: Aug. 7, 2007

(65) Prior Publication Data

US 2008/0095113 A1    Apr. 24, 2008

(30) Foreign Application Priority Data

Oct. 20, 2006    (KR) ...................... 10-2006-0102408

(51) Int. Cl.
*H04W 4/00* (2009.01)
(52) U.S. Cl. .................. 370/331; 370/338; 455/436
(58) Field of Classification Search ......... 370/328–329, 370/331–333, 338; 455/436–439, 443–445
See application file for complete search history.

(56) References Cited

U.S. PATENT DOCUMENTS

| | | | | |
|---|---|---|---|---|
| 2005/0286553 | A1* | 12/2005 | Wetterwald et al. | 370/466 |
| 2006/0120382 | A1* | 6/2006 | Thubert et al. | 370/395.52 |
| 2007/0230410 | A1* | 10/2007 | Thubert et al. | 370/338 |
| 2007/0253377 | A1* | 11/2007 | Janneteau et al. | 370/338 |

(Continued)

FOREIGN PATENT DOCUMENTS

KR    10/2003/0030993    4/2003

(Continued)

OTHER PUBLICATIONS

Won-Tae Kim; "*DynaMo NET: Dynamic Multi-homed IP v6 Mobile Networks with Multiple Mobile Routers*"; Ubiquitous Computing Systems; Third International Symposium, USC 2006; Springer; pp. 398-413.

(Continued)

*Primary Examiner*—Chi H. Pham
*Assistant Examiner*—Kevin Mew
(74) *Attorney, Agent, or Firm*—Lowe Hauptman Ham & Berner LLP (57) ABSTRACT

Provided is a root mobile router and the operating method thereof in a dynamically composed moving network, capable of forming a self-configuring ad-hoc network between wireless personal area networks (WPANs) of each user in a moving network and supporting a stable connection between the network and the Internet. The method includes the steps of: receiving state information of multiple access networks and selecting an optimal access network in order to connect to the Internet; receiving a result of the selection and activating an interface of the selected access network; changing the selected access network to the activated access network interface; and updating routing path information automatically and stably transmitting an IP packet to the Internet through the selected access network interface. Therefore, a personal mobile terminal can be utilized as a mobile router.

10 Claims, 5 Drawing Sheets

U.S. PATENT DOCUMENTS

2008/0267186 A1* 10/2008 Boukis et al. ............... 370/392
2009/0010223 A1* 1/2009 Hirano ....................... 370/331
2009/0219900 A1* 9/2009 Kokkinen et al. ........... 370/338

FOREIGN PATENT DOCUMENTS

KR     1020050077835     8/2005

OTHER PUBLICATIONS

Won-Tae Kim; "A Novel Architecture for Dynamic Mobile Networks with IPv6-based Multiple Network Interfaces"; Journal of the Institute of Electronics Engineers of Korea; pp. 25-35; Aug. 25, 2006.

Notice of Allowance for Korean App. 10-2006-0102408.

* cited by examiner

ROOT MOBILE ROUTER AND THE OPERATING METHOD THEREOF IN DYNAMICALLY COMPOSED MOVING NETWORK

CROSS-REFERENCE TO RELATED APPLICATION

This application claims priority to and the benefit of Korean Patent Application No. 2006-0102408, filed Oct. 20, 2006, the disclosure of which is incorporated herein by reference in its entirety.

BACKGROUND

1. Field of the Invention

The present invention relates to a root mobile router in a dynamically composed moving network, and more particularly, to a root mobile router and the operating method thereof in a dynamically composed moving network, capable of forming a self-configuring ad-hoc network between wireless personal area networks of each user in a moving network and supporting a stable connection between the network and the Internet.

2. Discussion of Related Art

A moving network refers to a type of network which can move itself. For example, a network configured in a moving body such as vehicle, ship or aircraft is referred to as a moving network. Such a moving network can be configured in a moving body in a wired or wireless manner. At this time, wireless personal area networks (WPANs) are gathered to configure a large type of moving network so they move all together, and hereinafter, such a moving network is referred to as a dynamically composed moving network.

Meanwhile, the mobile router refers to a router located at a border to connect an internal network and the Internet to each other in the moving network, which may include multiple network interfaces.

Recently, with the development of various access network technologies including an infrastructure mode and an ad-hoc mode, the evolution of mobile communication networks is being accelerated to Beyond 3rd Generation (B3G). In particular, the trend is toward seamless Internet connectivity that is increasingly needed by mobile users who wish to enjoy ubiquitous computing and communication, and the most important issue is to provide a delicate communication service for seamless mobility support in order to support ubiquitous computing/communication, that is, a condition in which free computing and communication are available regardless of time, position and device constraints.

A mobile IP (hereinafter, referred to as an MIP) of Internet engineering task force (IETF) may be the most appropriate presently existing communication technology which can support wide area mobility for a number of devices around us. This will be described in more detail with reference to the accompanying drawings.

Figure 1:
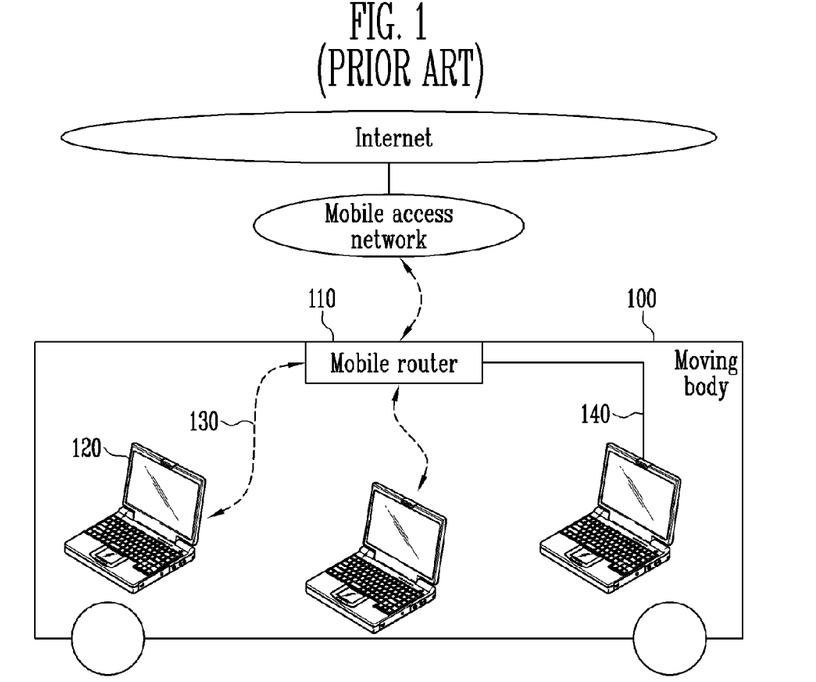
FIG. 1 illustrates the configuration of a conventional mobile network system.

FIG. 1 illustrates the configuration of a conventional moving network system.

Referring to FIG. 1, the moving network system includes a moving body 100, a mobile node 120 and a mobile router 110 in the moving body, and a mobile access network accessing the Internet.

The moving body 100 can take a variety of forms, including an automobile, a bus, a train and a ship, for example. The moving body 100 has a fixed type of mobile router 110 which can provide the moving body 100 with Internet access.

The mobile router 110 employs all functions of a general router, and mobile nodes 120 of the moving body 100 keep connectivity to the mobile router 110 through a wireless network 130 or a wired network 140, so they are connected to the Internet. At this time, in order to provide a global mobility, the mobile router 110 can have a handover protocol such as a mobile IP.

Figure 2:
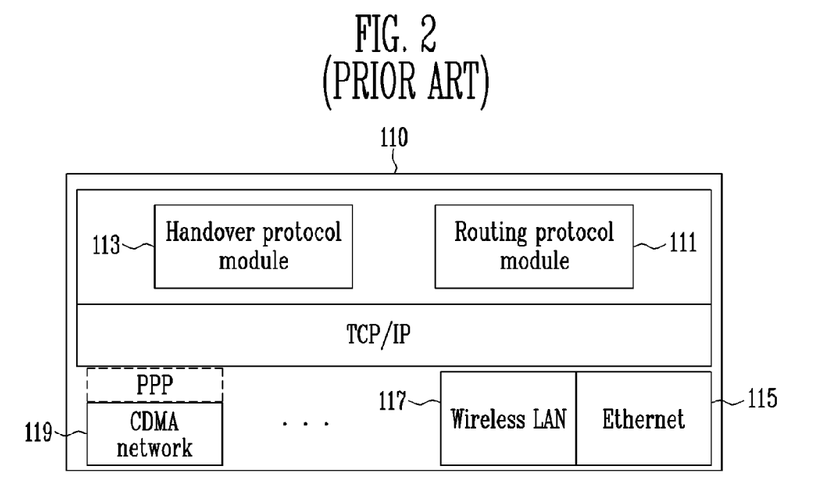
FIG. 2 illustrates the configuration of a general mobile router.

FIG. 2 illustrates the configuration of a general mobile router.

Referring to FIG. 2, the general mobile router 110 basically includes a routing protocol module 111 and a handover protocol module 113 to provide a global mobility. It includes an Ethernet 115 as an internal network interface to provide wired networking, and a wireless LAN 117 for wireless networking. It also includes an interface such as a CDMA network interface 119 for an external network interface, thus providing wide area mobility.

However, since the mobile IP described above is designed to support a single terminal mobility only, it cannot sufficiently support a moving network of the moving body 100 shown in FIG. 1 or network mobility technically.

Further, while the mobile router 110 of the moving network shown in FIG. 1 is fixed to the moving body 100 in order to supply power thereto, the moving body 100 does not provide the mobile router 110 in itself in many cases. Accordingly, a study is under way to utilize a wireless personal mobile terminal as a mobile router.

SUMMARY OF THE INVENTION

The present invention is directed to a root mobile router and the operating method thereof in a dynamically composed moving network including multiple mobile routers.

One aspect of the present invention provides a root mobile router in a dynamically composed moving network, the root mobile router including: a network selection module for selecting an access network suitable for a moving network or determining whether to change an access network already selected using state information of multiple access networks; a handover processing module for maintaining connectivity between each of mobile nodes connected to a plurality of mobile routers of the moving network and Internet through the access networks; a routing protocol module for transferring an IP packet generated in the mobile node to the Internet through the access networks; a root mobile router selection module for selecting one of the plurality of mobile routers according to a specified algorithm and setting the selected router as a root mobile router; and a central control module for receiving access network information selected from the network selection module and calling for the routing protocol module to change the access network, and receiving information on whether the mobile network is interfered or not and calling for the root mobile router selection module to change the root mobile router when the mobile network is interfered.

Another aspect of the present invention provides an operating method of a root mobile router in a dynamically composed mobile network, the method including the steps of: (a) receiving state information of multiple access networks and selecting an optimal access network in order to connect to the Internet; (b) receiving a result of the selection and activating an interface of the selected access network; (c) changing the selected access network to the activated access network interface; and (d) updating routing path information automatically and stably transmitting an IP packet to the Internet through the selected access network interface.

Other objects and advantages of the present invention can be understood and will become more apparent with reference to embodiments of the present invention. Further, it will be easily appreciated that the objects and advantages of the present invention can be embodied by means and combinations thereof as defined by the appended claims.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

The present invention assumes that ad-hoc networks each having a mobile router are arbitrarily and dynamically gathered to construct a larger mobile ad-hoc network and moved all together when they move in a common moving body such as a vehicle, or for the purpose of a common interest, as in on a battle field, for example. That is, the present invention presupposes an overlapping ad-hoc network type of moving network.

Those mobile routers in self-configuration select one or more root mobile routers from the moving network to which they belong and use the root mobile router(s) as a common network interface directed to an external network.

Since the mobile routers of each mobile ad-hoc network have a peer-to-peer relationship, that is, a relationship of equality to one another, all the mobile routers should be able to be selected according to a root mobile router selection algorithm for the purpose of load dispersion and interference avoidance, in order to stably process traffic occurring in the entire mobile network.

Figure 3:
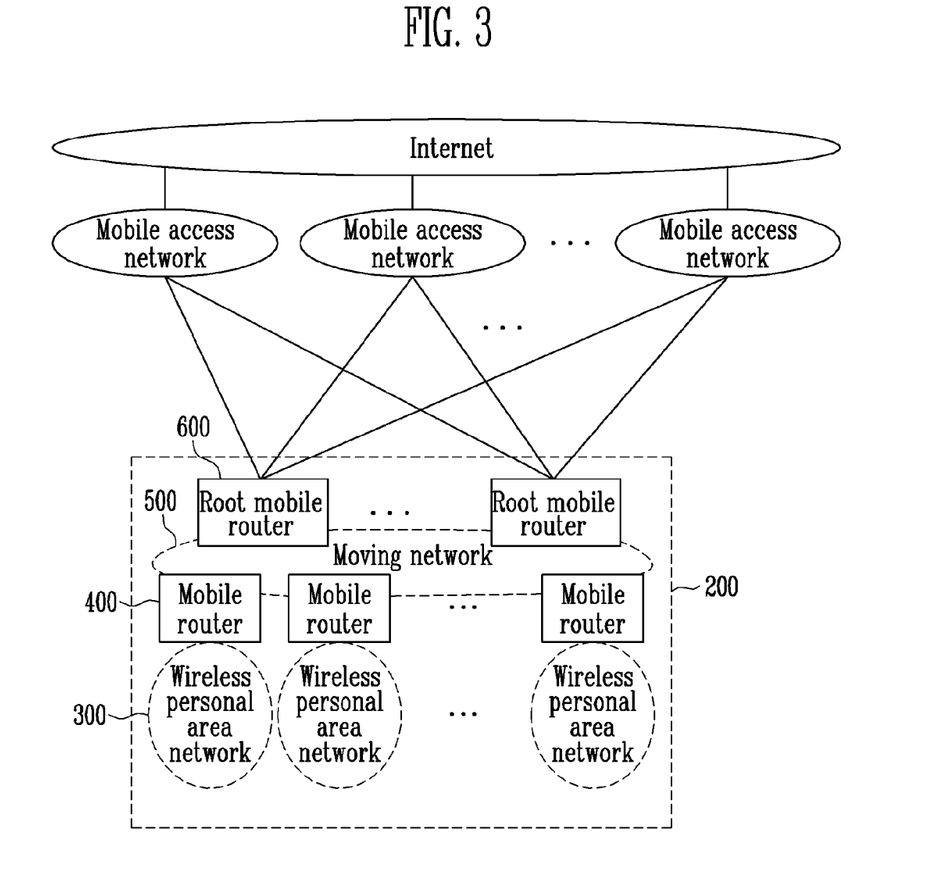
FIG. 3 illustrates the configuration of a dynamically composed moving network system according to the present invention.

FIG. 3 illustrates the configuration of a dynamically composed moving network system according to the present invention.

Referring to FIG. 3, in the system, wireless personal area networks (WPANs) 300 forming a mobile network in a moving body 200 which does not include a mobile router 110 shown in FIG. 1 include at least one mobile router 400, respectively.

The mobile router 400 serves to connect an assigned WPAN 300 to a moving network 500 formed in the moving body 200, and at the same time assigns IP addresses to nodes in the WPAN 300 to communicate with nodes in the moving network (for example, an IP accessible digital camera and so on) or Internet nodes (for example, a server operating its own E-mail account and so on). Further, while the mobile router 400 may include multiple network interfaces, it is appropriate that the mobile router 400 uses an interface to connect a small size network such as a wireless LAN or a WPAN 300 in order to connect to the moving network 500.

Each WPAN 300 includes at least one mobile router 400 and selects anyone of the mobile routers 400 to assign it as a representative mobile router of the related WPAN 300. The representative mobile router is set as a root mobile router 600 and is used to maintain continuous connectivity with the Internet. At this time, the root mobile router 600 having connectivity with the Internet uses an optimal access network interface which is appropriate to a request made in the moving network 500 among the access network interfaces held in the root moving router 600. When it is not easy to accept the request made in the moving network, an operation is performed, such as a change of the access network interface, or a change or an addition of the root mobile router 600 case by case.

As such, in the dynamically composed moving network 500, by performing the operation of selecting the root mobile router 600 in self-configuration so as to provide Internet connectivity, and constructing an additional root mobile router 600 or changing root mobile router 600 case by case, stable Internet access is assured.

Figure 4:
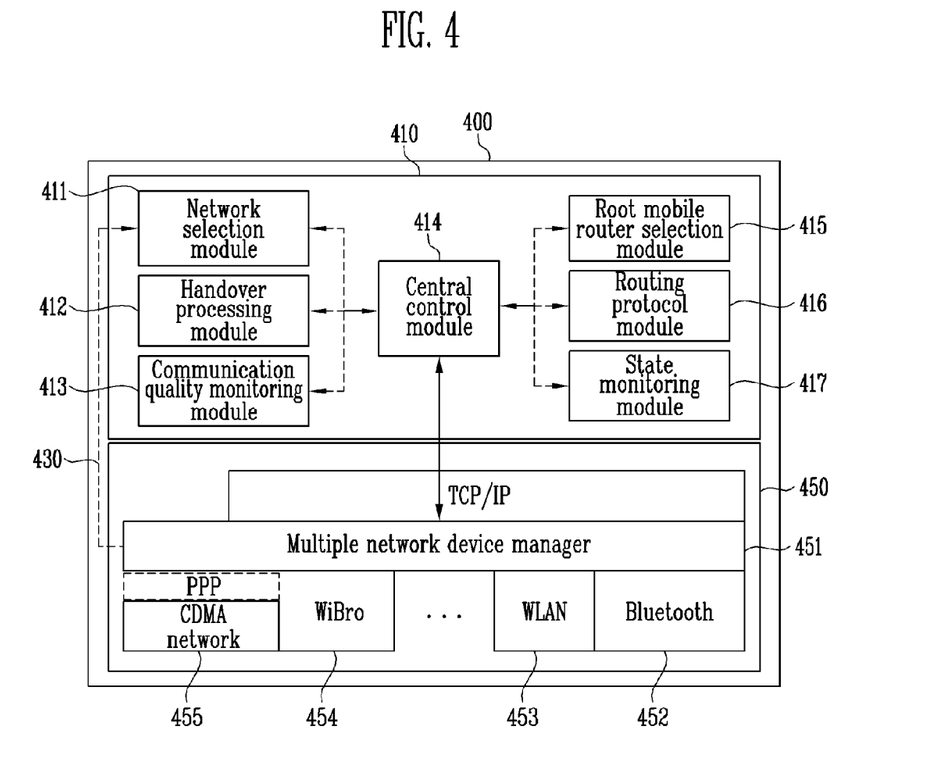
FIG. 4 illustrates the configuration of a mobile router according to the present invention.

FIG. 4 illustrates the configuration of a mobile router according to the present invention.

Referring to FIG. 4, a mobile router 400 generally includes a mobile router controller 410 and a mobile router transmitter 450.

The mobile router controller 410 includes a network selection module 411 for selecting an optimal access network among multiple network interfaces or determining to change the selected access network when it is connected to the Internet, a handover processing module 412 for maintaining continuous Internet connectivity while a moving body is moving, a root mobile router selection module 415 for assuring that nodes in the moving network are connected to the Internet when the moving network is constructed, the root mobile router being a representative of other mobile routers, a routing protocol module 416 for operating a routing protocol and transferring an IP packet to an appropriate access network interface, a state monitoring module 413 for continuously monitoring state information of energy of the mobile router or other operational matters, a communication quality monitoring module 417 for monitoring whether a requested communication quality is maintained constantly, and a central control module 414 for controlling a message flow among the modules described above and an operation of each module.

The mobile router transmitter 450 includes a multiple network device manager 451 forming a TCP/IP protocol stack based IP communication structure and managing a multiple network interface.

The multiple network device manager 451 receives an optimal access network interface selected by the network selection module 411 from the central control module 414 of the mobile router, and activates the selected access network interface or deactivates unnecessary access network interfaces, thereby reducing the energy consumed in the mobile router to a minimum. At this time, while FIG. 4 illustrates a CDMA network interface 455, a WiBro interface 454, a WLAN interface 453 and a Bluetooth interface 452 as examples of the network interface, those skilled in the art can appreciate that the network interface is not limited to those described above.

An operation for when the mobile router 400 constructed as described above is selected as the root mobile router 600 will be described.

First, the network selection module 411 is periodically or randomly provided with state information of the access networks to connect to the Internet over a triggering channel 430 directed to the multiple network device manager 451, and selects an optimal access network.

Then, the central control module 414 receives a result of the selection and calls for the multiple network manager 451 to activate the selected access network interface. Subsequently, the central control module 414 controls to call for the handover processing module 412 and to change the selected access network to the activated access network interface.

After a series of access network change procedures are finished, a routing protocol module 416 updates routing path information automatically and transmits the IP packet to the Internet through selected access network interface as described above.

Meanwhile, when one of the general mobile routers 400 is selected and operated as the root mobile router 600 in the moving network, the root mobile router 600 consumes a lot of energy compared with the general mobile routers 400. Accordingly, it is necessary to change the root mobile router 600 in order to stably provide network connectivity, or to select an additional root mobile router 600 in order to assure the required communication quality.

That is, when the state monitoring module 471 continuously monitors whether problems occur in the moving network system of the moving body and when a problem occurs, or when the communication quality monitoring module 413 monitors the communication quality provided by the root mobile router 600 and then determines that stable and continuous communication quality is not assured, the state monitoring module 471 or the communication quality monitoring module 413 calls for the central control module 414 and requests to solve the problem described above. At this time, the central control module 414 calls for the root mobile router selection module 415 and requests to construct an additional or substitute root mobile router 600.

The root mobile router selection module 415 forms a logical ring structure in advance, between the mobile routers which can be the root mobile router 600, and then transfers a token to the next mobile router 400 in the ring structure described above when calling for the central control module 414. And, when it satisfies a condition that the next mobile router can be a root mobile router, the root mobile router selection module 415 selects a new root mobile router. At this time, it is appropriate to select a mobile router which can overcome communication interference while assuring quality of service (QoS), and such a root mobile router selection algorithm is merely an example. The root mobile router can be selected in a variety of manners.

Figure 5:
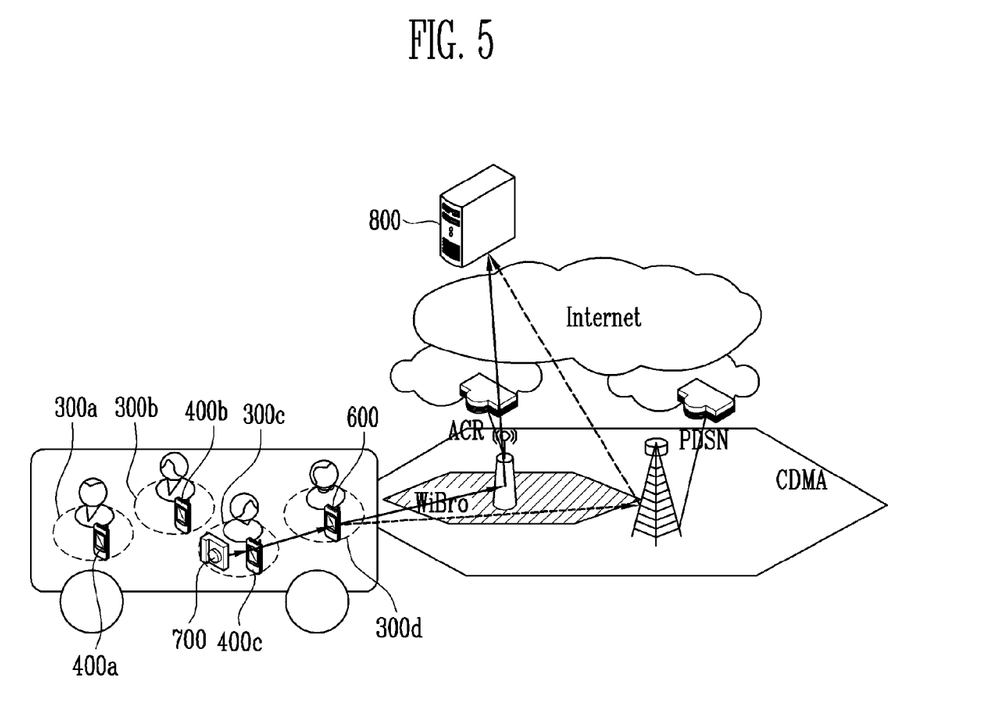
FIG. 5 is a view illustrating a method of connecting to the Internet through a root mobile router according to the present invention.

FIG. 5 is a view illustrating a method of connecting to the Internet through a root mobile router according to the present invention.

Referring to FIG. 5, each of areas 300a, . . . , 300d indicated in dotted lines is set as WPAN 300, each of mobile terminals 400a, . . . , 400d is set as a mobile router 400, one of the mobile routers is set as a root mobile router 600, and a moving network in the moving body is connected to the Internet through an external network using the root mobile router 600.

For example, the WPAN 300 includes a user device 700 in addition to the mobile terminals 400a, . . . , 400d, the user device 700 is assigned an IP and transfers an IP packet to the mobile terminals 400a, . . . , 400d which are the mobile routers 400 through the WPAN 300 to which the user device belongs, and the related mobile router 400 routes the IP packet to the root mobile router 600 which takes charge of the entire moving network. Then, the IP packet is transferred to the final server 800 through an optimal network interface selected by the root mobile router 600.

Figure 6:
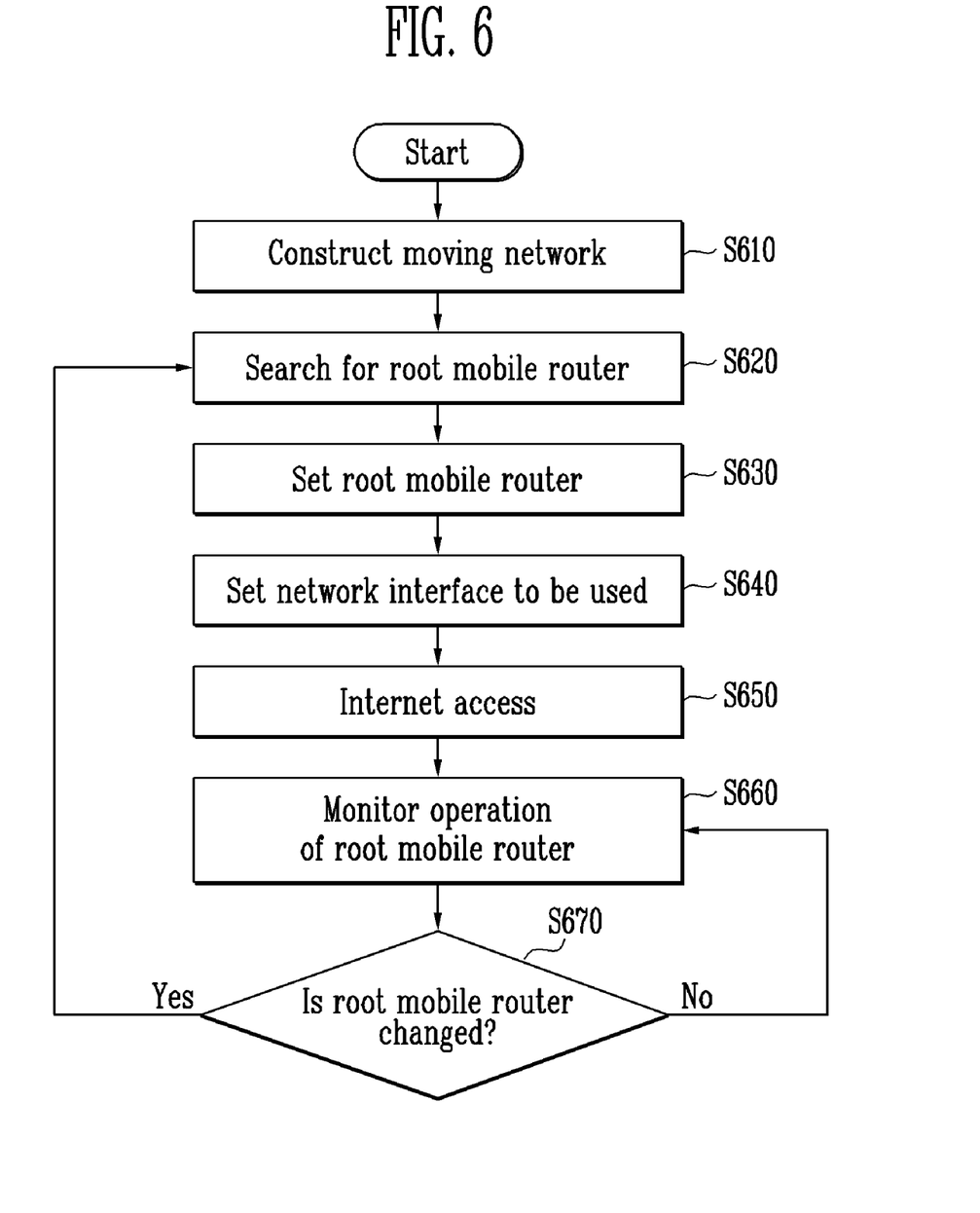
FIG. 6 is a flowchart illustrating a method of selecting a root mobile router and the operating method thereof in a dynamic mobile network according to the present invention.

FIG. 6 is a flowchart illustrating the method of selecting a root mobile router and the operating method thereof in a dynamically composed moving network according to the present invention.

Referring to FIG. 6, first, a WPAN 300 is arbitrarily or intentionally mounted on a moving body 200 to construct a moving network 500 (S610).

The mobile routers 400 in each WPAN 300 search for the mobile router 400 existing in the entire mobile networks 500 by exchanging messages with one another, and select the root mobile router 600 according to a predetermined algorithm (S620-S630). At this time, a variety of algorithms exist to select the root mobile router 600, including algorithms based on token, time, energy and position.

Subsequently, the root mobile router 600 selected in step S630 selects a network interface to be used, activates the selected network interface and then assures Internet connectivity as shown in FIG. 5 (S640-S650).

Next, while the root mobile router 600 is being operated, a system monitoring module 471 and a communication quality monitoring module 413 continuously perform monitoring and check whether problems occur (S660). When the root mobile router 600 needs to be changed as a result of the check, the process returns to step S620 and the root mobile router 600 is reselected or selected additionally (S670).

According to the present invention, the personal mobile terminal can be utilized as a mobile router, when the moving body is not provided with the mobile router, or when the moving body is not appropriately provided with the mobile router, due to problems such as power.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A root mobile router in a dynamically composed moving network, comprising:
   a network selection module for selecting an access network suitable for a moving network or determining whether to change an access network already selected using state information of multiple access networks;
   a handover processing module for maintaining connectivity between each of mobile nodes connected to a plurality of mobile routers of the moving network and the Internet through the access networks;
   a routing protocol module for transferring an IP packet generated in the mobile node to the Internet through the access networks;
   a root mobile router selection module for selecting one of the plurality of mobile routers according to a specified algorithm and setting the selected router as a root mobile router; and
   a central control module for receiving access network information selected from the network selection module and calling for the routing protocol module to change the access network, and receiving information on whether the mobile network is interfered or not and calling for the root mobile router selection module to change the root mobile router when the mobile network is interfered.

2. The root mobile router of claim 1, further comprising a network device manager connected to the network selection module over a triggering channel to provide the state information of the multiple access networks periodically or randomly.

3. The root mobile router of claim 1, further comprising:
a state monitoring module for monitoring state information of the root mobile router; and
a communication quality monitoring module for monitoring whether a communication quality already set between the moving network and the external network is maintained constantly.

4. The root mobile router of claim 2, further comprising:
a state monitoring module for monitoring state information of the root mobile router; and
a communication quality monitoring module for monitoring whether a communication quality already set between the moving network and the external network is maintained constantly.

5. The root mobile router of claim 1, wherein the root mobile router selection module forms a logical ring structure between the mobile routers in advance, and, by transferring a token to a neighboring mobile router in the ring structure when the central control module is called, selects the neighboring mobile router as a new root mobile router if a condition that the neighboring mobile router can be the root mobile router is satisfied.

6. An operating method of a root mobile router in a dynamically composed mobile network, the method comprising the steps of:
(a) receiving state information of multiple access networks and selecting an optimal access network in order to connect to the Internet;
(b) receiving a result of the selection and activating an interface of the selected access network;
(c) changing the selected access network to the activated access network interface; and
(d) updating routing path information automatically and transmitting an IP packet to the Internet stably through the selected access network interface.

7. The operating method of claim 6, further comprising, prior to the step (a), the steps of:
(a-1) constructing the moving network by mounting a wireless personal area network WPAN on a moving body;
(a-2) searching for a mobile router existing in the moving network by exchanging messages between the mobile routers of each WPAN; and
(a-3) selecting one of the searched mobile routers as the root mobile router according to a specified algorithm.

8. The operating method of claim 6, further comprising the steps of:
(e) requesting a change of the root mobile router when a problem occurs on the mobile network, or when a stable and continuous communication quality is not assured; and
(f) selecting a new root mobile router from the mobile routers according to a specified algorithm.

9. The operating method of claim 6, in the step (a), wherein the state information of the multiple access networks is received over a triggering channel 10. The operating method of claim 8, wherein the specified algorithm is an algorithm based on at least one of token, time, energy and position.

* * * * *